United States Patent
Rosati et al.

(10) Patent No.: US 7,163,740 B2
(45) Date of Patent: Jan. 16, 2007

(54) PROCESS FOR PRINTING ADHESIVES, ADHESIVE ARTICLES AND PRINTING EQUIPMENT

(75) Inventors: Rodrigo Rosati, Francaville al Mare (IT); Pier-Lorenzo Caruso, Pescara (IT); Julian Ashton Plumley, Ontario (CA)

(73) Assignee: The Procter & Gamble Company, Cincinnati, OH (US)

( * ) Notice: Subject to any disclaimer, the term of this patent is extended or adjusted under 35 U.S.C. 154(b) by 90 days.

(21) Appl. No.: 10/716,133

(22) Filed: Nov. 18, 2003

(65) Prior Publication Data

US 2004/0134596 A1 Jul. 15, 2004

Related U.S. Application Data

(63) Continuation of application No. PCT/US02/16893, filed on May 30, 2002.

(30) Foreign Application Priority Data

Jun. 2, 2001 (EP) .................................. 01113497

(51) Int. Cl.
*A61F 13/15* (2006.01)
(52) U.S. Cl. ...................... 428/343; 156/232; 156/238; 604/358; 604/365
(58) Field of Classification Search ............. 428/317.1, 428/317.3; 402/149
See application file for complete search history.

(56) References Cited

U.S. PATENT DOCUMENTS

| | | | |
|---|---|---|---|
| 1,793,082 A | 2/1931 | Goss | |
| 3,070,476 A | 12/1962 | Miller | |
| 3,257,263 A | 6/1966 | Miller | |
| 3,352,741 A | 11/1967 | Miller | |
| 3,507,729 A | 4/1970 | Miller | |
| 3,929,135 A | 12/1975 | Thompson | |
| 4,069,822 A | 1/1978 | Buell | |
| 4,324,246 A | 4/1982 | Mullane et al. | |
| 4,342,314 A | 8/1982 | Radel et al. | |
| 4,342,613 A | 8/1982 | O'Leary et al. | |

(Continued)

FOREIGN PATENT DOCUMENTS

CH     347 603 A     7/1960

(Continued)

OTHER PUBLICATIONS

Fiorilla, Chris: Correspondence with H. B. Fuller; Feb. 24, 2006.*

(Continued)

*Primary Examiner*—Melvin Mayes
*Assistant Examiner*—Kim McClelland
(74) *Attorney, Agent, or Firm*—Jay A. Krebs; George H. Leal; Charles R. Matson

(57) ABSTRACT

The present invention relates to a process for printing specific adhesives onto articles, such as absorbent articles or release paper, using a specific transfer tool and/or a specific adhesive, having a specific peel force, viscosity, elastic loss modulus, elastic modulus, surface energy and loss tangent modulus; the invention also relates to articles comprising the specific adhesives and to specific printing rolls.

7 Claims, 3 Drawing Sheets

U.S. PATENT DOCUMENTS

| | | | |
|---|---|---|---|
| 4,404,243 A | 9/1983 | Terpay | |
| 4,428,997 A | 1/1984 | Shulman | |
| 4,463,045 A | 7/1984 | Ahr et al. | |
| 4,507,351 A | 3/1985 | Johnson et al. | |
| 4,562,099 A | 12/1985 | Hinchcliffe | |
| 4,609,518 A | 9/1986 | Curro et al. | |
| 4,629,643 A | 12/1986 | Curro et al. | |
| 4,661,194 A | 4/1987 | Lovald | |
| 4,725,465 A | 2/1988 | Lastovich | |
| 4,784,044 A | 11/1988 | Klement | |
| 4,946,527 A | 8/1990 | Battrell | |
| 4,950,254 A | 8/1990 | Andersen et al. | |
| 5,006,394 A | 4/1991 | Baird | |
| 5,019,239 A | 5/1991 | Owen | |
| 5,326,415 A | 7/1994 | Thomas et al. | |
| 5,750,444 A | 5/1998 | Jarrell et al. | |
| 5,900,109 A | 5/1999 | Sanders et al. | |
| 6,613,030 B1 * | 9/2003 | Coles et al. | 604/385.02 |
| 2001/0007003 A1 * | 7/2001 | Karim et al. | 525/330.5 |
| 2002/0177830 A1 * | 11/2002 | Fernandez-Kleinlein et al. | 604/385.01 |

FOREIGN PATENT DOCUMENTS

| | | |
|---|---|---|
| DE | 195 16 037 A1 | 11/1996 |
| DE | 196 28 294 A1 | 1/1998 |
| EP | 0 293 482 A1 | 12/1988 |
| EP | 0 358 434 A2 | 3/1990 |
| EP | 0 604 729 A1 | 7/1994 |
| EP | 0 731 151 A2 | 9/1995 |
| EP | 0 675 183 A1 | 10/1995 |
| EP | 0 745 433 A1 | 12/1996 |
| EP | 0 947 185 A2 | 10/1999 |
| EP | 0 951 884 A1 | 10/1999 |
| EP | 0 978 263 A1 | 2/2000 |
| GB | 836 097 A | 6/1960 |
| WO | WO 93/09741 | 5/1993 |
| WO | WO 94/21206 | 9/1994 |
| WO | WO 96/38113 | 12/1996 |
| WO | WO 00/07533 | 2/2000 |

OTHER PUBLICATIONS

Hans Heber, "Beschichtungen gegen Beschichtungen", Farbe+Lack, Curt R. Vincentz Verlag. Hanover, DE, vol. 105, No. 2, Feb. 1992, pp. 101-106, XP002175301, ISSN: 0014-7699.

Rudiger Haesster et al., "Wird Adheasion Endlich Messbar?", Adhasion Kleben Und Dichten, Gwv Fachverlag GmbH, Wiesbaden, DE, vol. 10, No. 38, 1994, pp. 36-38, ISSN: 0943-1454.

* cited by examiner

PROCESS FOR PRINTING ADHESIVES, ADHESIVE ARTICLES AND PRINTING EQUIPMENT

CROSS REFERENCE TO RELATED APPLICATIONS

This application is a continuation application of prior copending International Application No. PCT/US02/16893, filed May 30, 2002, designating the U.S.

FIELD OF THE INVENTION

The present invention relates to a process for printing specific adhesives onto articles, such as absorbent articles or release paper, using a specific transfer tool and/or specific adhesives; the invention also relates to articles comprising the specific adhesives and to specific printing tools (rolls).

BACKGROUND OF THE INVENTION

Absorbent articles such as sanitary napkins, panty liners, catamenials, incontinence inserts and diapers for adults or babies are commonly provided with an adhesive on their garment-facing surface to attach them during their usage period to a garment of the user, for example a pressure sensitive, hot melt adhesive. These adhesives are typically covered with a release paper prior to use. The adhesives thus need to stick to the garments well, to ensure the articles do not move during use.

More generally absorbent articles are provided with adhesive areas in order to combine the components, which ultimately make up part or the whole of the absorbent article. In particular, multi-layer structures forming the topsheet, core or backsheet are often combined by adhesives called construction adhesives.

Typically these products are made by high-speed machinery. Current machinery includes equipment, such as spray guns or slot coaters, which continuously or intermittently add the adhesive on the surface of an absorbent article. This needs to be done and can be done in a very fast manner, to ensure production at a very high speed. These types of processes are quite inflexible and inaccurate relative to the shape of the adhesive to be applied and they essentially can only provide the adhesive continuously. Alternatively, on/off systems for coating or spraying not only have the drawback of delay in their systems response but also generally the problems associated with accelerating and decelerating mass streams.

As alternative, more accurate printing processes using a printing rolls have been developed, examples of which are described in WO 96/38113 and EP 745 433-A; these documents describe to use a printing roll which rotates through an adhesive bath and contacts the surface of an absorbent article, which passes on the top of the coating roll. The roll can contain a specific pattern of cavities and is contacted with a scraper blade which scrapes off excess adhesive, so that mainly the cavities remain filled with the adhesive and thus, the pattern of the cavities can be transferred to the absorbent article.

As alternative process, WO 00/07533 suggest to replace the adhesive bath with a spraying tool or slot cater, positioned at the right or left hand side of the roll, which continuously applies an amount of adhesive onto a gravure printing roll with cavities, such that the cavities are filled to a certain extent only, which is then pressed against an absorbent article above the roll. A scraper blade is also provided which scrapes off any excess adhesive.

Even in these alternative method of printing an adhesive with a roll, such as gravure printing, it has been found that it is difficult to apply sticky, stringy adhesives with precision, such that for example the adhesive is about completely transferred from the roll, the exact required amount of adhesive is applied with precision, or for example all cavities, present on the printing roll, contain the exact required amount of adhesive and this is about all transferred, e.g. if the volume of all the cavities is the same, such that each cavity contains an equal amount of adhesive. Another major problem with the printing processes of the prior art is that the used techniques frequently result in stringing of the adhesive during application onto the article; the resulting strings are a form of contamination on the articles, typically resulting in an uneven pattern of the adhesive. This is in particularly the case when the process is performed at a high speed, such as normally necessary in economically feasible production processes, e.g. of more than 20 m/min, or even more than 100 m/min or even more than 200 m/min.

Furthermore, these known methods are such that the adhesive typically has to be heated to very high temperatures, in order to be sprayed, and that the temperature of the adhesive and the roll (or the difference between these temperatures) is difficult to control. Also, whilst slot coaters can apply the adhesive very finely, the applied adhesive tends to clump together, seeking to minimize surface area. Thus, an uneven application is obtained in practice. Furthermore, adhesive applied with slot coaters tends to fly off the rotating roll after application, especially when the adhesive clumps together and/or when they are very hot and more viscous.

Hence, there still exists a need to provide an improved (continuous) high speed process to apply adhesives or other sticky materials to articles, which addresses the problem of the known printing techniques, as discussed above, and thus, provides an even more accurate and efficient way to apply sticky materials, such as adhesives, onto articles, typically in a shaped designs.

The inventors found that this is achieved by using a specific transfer tool, preferably a printing roll, with specific surface features and/or adhesives with specific properties. In more detail, the inventors have found that the adhesive has to have certain properties to be sticky enough to ensure an article adheres to the garments of the user or to adhere two articles or two parts of articles together, whilst still transferable, in particular whilst not causing stringing during the transfer (printing) process and whilst being transferred about completely from the transfer tool onto the article. Whilst it has been recognized in the prior art that there is a potential conflict between the requirements for adhesives to be transferable or printable and also to be able to adhere sufficiently to the garment, neither any further understanding of this conflicting problem nor a solution has been found to date; the printing rolls and adhesives used for the (production of) absorbent articles described in the prior art do not have the properties of the presently used printing rolls and adhesives.

The process of the invention thus provides a much more accurate and efficient application of the sticky material onto the article. Furthermore, the process of the invention, using a transfer tool with a specific surfaces and/or a specific adhesive, results in a significantly reduced level of contamination by stringing or even no stringing at all, i.e. due to the nature of the transfer tool and/or the adhesive used herein, stringing can be (almost) avoided. This thus also helps to ensure the adhesive is applied exactly as required, e.g. as a completely evenly applied layer, or in a very specific pattern, for example exactly corresponding to the pattern of cavities on the transfer tool. The articles obtained by this process thus have a much more uniformly applied layer or (dot) pattern of the sticky material, such as the adhesive, compared to the absorbent articles of the prior art.

SUMMARY OF THE INVENTION

In a first embodiment, the present invention relates to a process for transferring from a surface of a transfer tool a sticky material, typically having a peel force of at least 0.1 N/cm onto an article, series of articles or web of articles, whereby the contact angle of the material and the surface of the tool is more than 60°, preferably more than 80°, at the process temperature.

In a further embodiment, the invention provides a process for transferring from a surface of a transfer tool a sticky material, typically having a peel force of at least 0.1 N/cm onto an article, series of articles, or a web of articles, with reduced stringing, characterized in that the active material has a) a viscosity η of less than 2500 mPa·s at process temperature, typically less than 1500 or even less than 1000 mPa·s at process temperature;

b) an elastic modulus G' which increases from 10 to 10,000 Pa in less than 60° C. temperature range, preferably in a less than 40° C. temperature range or even in a less than 30° C. temperature range, or even less than 20° C. temperature range or even in a less than 10° C. temperature range.

The sticky material is typically such that it has c) an elastic modulus G' at 20° C. of less than 100,000 Pa, preferably less than 50,000 Pa or even less than 20,000 Pa d) a loss tangent tan δ (G"/G') at 20° C. of more than 0.5, preferably more than 1.0;

e) a surface energy σ at 20° C. of less than 35 mJ/m$^2$, preferably less than 25 mJ/m$^2$.

Preferably, the process is such that the contact angle is as described above and also the sticky material has the properties as described above.

The article is preferably a component or part of a sanitary napkin, panty liner, incontinence pad, adult diaper, baby diaper, plaster, or bandage. Preferred is that the article comprises at least a backsheet, as described herein and that the active material (typically an adhesive) is present (or applied in the process herein) on the backsheet of the article, which is to face the garment of the user. Also preferred may be that the article is a release strip of the absorbent article, typically to be attached to the backsheet of the article, and the active material is applied to this release strip.

The invention also relates to absorbent article, preferably a sanitary napkin, panty liner, incontinence pad, adult diaper, baby diaper, plaster or bandage, comprising a sticky, material preferably also comprising a pigment, as described herein after, the material having the properties defined above in a) and b) and preferably c), d) and e).

The invention also relates to a gravure-printing roll having a coating on its surface, which has the herein-specified contact angle with the sticky material as defined above, the surface preferably having a coating with a polyfluorinated polymer. Preferred coatings are described in detail below.

Preferred materials are adhesives, such as those used to adhere different parts of an absorbent article together, or adhesives for attaching absorbent articles removably, for example to attach absorbent articles to the garment of the wearer.

Preferably, the transfer tool is a printing roll, preferably a printing tool having a surface with cavities. Preferred herein is a gravure printing process using such a printing roll.

The process is preferably a high-speed process, preferably a continuous process whereby the material (adhesive) is continuously applied on a printing roll and subsequently continuously applied on a web of articles. The process preferably has a speed of at least 20 m/min, more preferably at least 100 m/min, or even at least 150 m/min.

The process is preferably such that the material is applied in high amounts on-dot, i.e. the area (dots) which comprise the material, comprise this in high amounts, whilst there may be other areas in between these areas (dots) which do not comprise any material, and therefore, the total amount per surface area may be much lower then the on-dot amount. Preferably, the on-dot amount is as high as at least 10 g/m$^2$, preferably at least 20 g/m$^2$ or even at least 40 g/m$^2$, as measured per surface area of covered area.

Preferably, the process is part of a gravure printing process.

DETAILED DESCRIPTION OF THE INVENTION

Sticky Active Material

Figure 1:
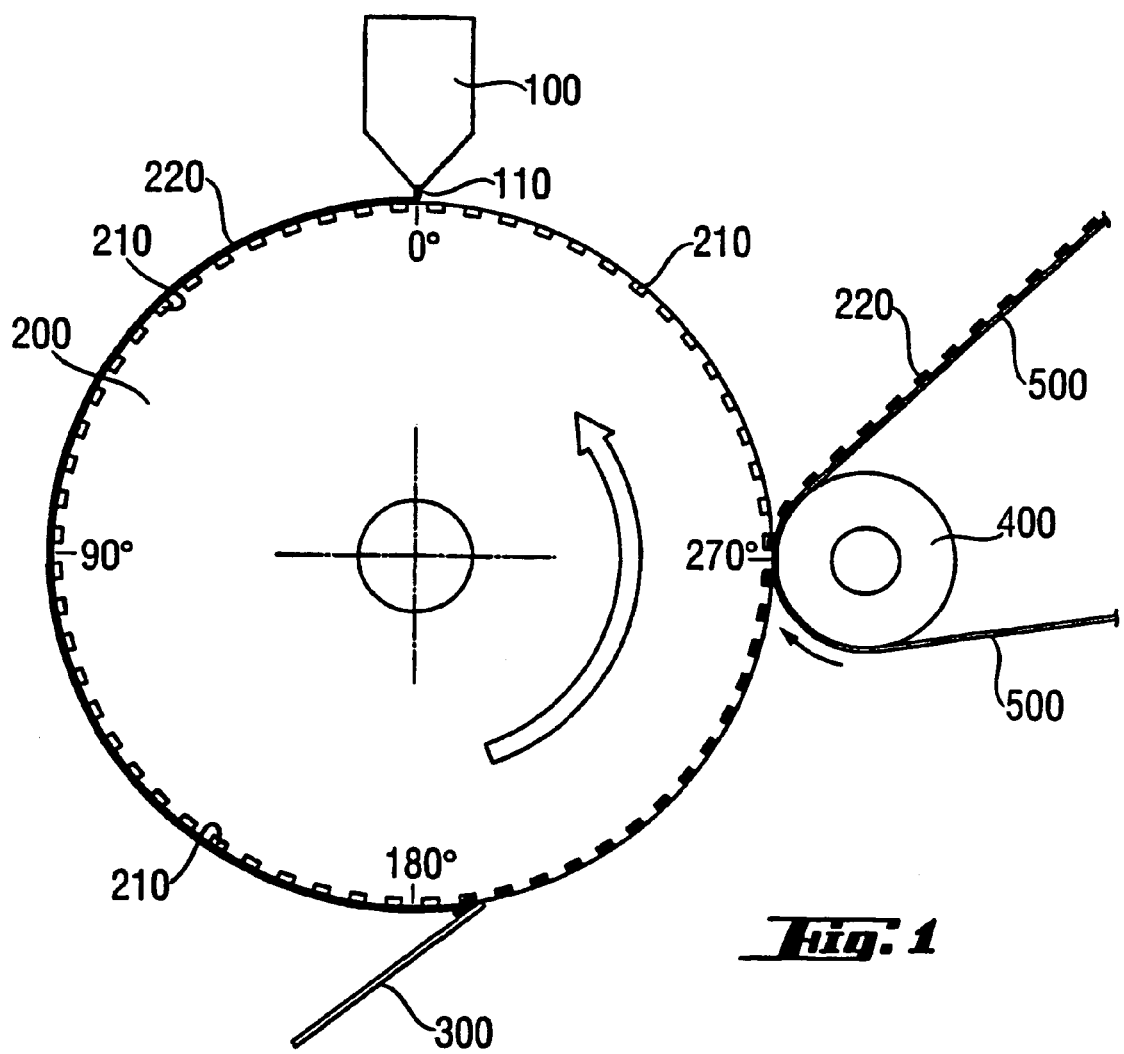
FIG. 1 shows a cross-sectional, schematic view of the printing equipment of the invention as used in printing process of the present invention.

The material herein is sticky which typically means that the material has a certain minimum peel value.

The material has a peel force of at least 0.1 N/cm, or even more than 0.2 N/cm, or even more than 0.4 N/cm. This is the peel force of the active material when applied in an average base weight of 20 g/cm$^2$ on a surface, as described in the test below. Of course, the material can be applied in different amount on the articles herein.

The peel force can be determined as follows:

An article or part thereof comprising on one of its surfaces the active material in an amount such that the average base weight is 20 g/cm$^2$ (the sample and active being at room temperature), is placed on a rigid support with the surface with the active material facing upward, away from the support. The sample is fixed to the support by grips in a tightly and wrinkle-free manner. Then a piece of cotton (100%), known as Weave Style no.429W, available from Loeffler, is placed on top of the surface with the active material, such that one end of the cotton sample extends about 25 mm from the end of the sample with active material. Then, a weight is placed on the thus formed sample-cotton combination for 30 seconds, such that the whole combination is covered and a weight of 26–27 g/cm$^2$ is applied, to ensure that the combination is pressed in a gentle and even manner.

Then, a Zwick tensile tester (available from Zwick GmbH) is used to measure the peel force required to remove the cotton from the sample. Hereto, the support, sample covered by cotton is placed in the lower clamp of the tensile tester and the tail end of the cotton (the one opposite to the free 25 mm specified above) is placed in the upper clamp of the tensile tester. The Zwick tensile tester is set on a speed of 40 inch/minute. Typically the clamps are 250 mm spaced apart.

Then, within 1 minute after removal of the compression weight, the tensile tester is started and this will measure the force required (to peel off the cotton) along the displacement of the upper clamp, which moved in an angle of 180 with the sample. The peel force is calculated as the average of the force peaks over a 5 inches path. The first 1.0 inches and last 1.5 inches of the measurement are not taken into account by the calculation of the peel force, to avoid influences of acceleration and deceleration.

The above test is for example done on a sample of the shape and size of a regular Always pantiliner, using a support plate of 54×126 mm and a weight of 2.1 Kg. The method can be easily adjusted by the skilled person for different sample sizes.

Typically, the material is also viscous, and the specific viscosity $\eta$ of the material is less than 2500 mPa·s, or even less than 1500 mPa·s, at process temperature. Preferred may even be that the viscosity is less than 1000 mPa·s, more preferably below 800 mPa·s, or even below 700 mPa.s, at the process temperature. Typically, the material has a specific viscosity $\eta$ (at the process temperature) of more than 100 mPa·s, preferably more than 200 mPa.s. The process temperature, when used herein is the temperature of the surface of the transfer tool, or of the tool as a whole. The viscosity can be measured using the method ASTM D3236-88.

The material also has an elastic modulus G' which increases from 10 to 10,000 Pa in less than 60° C. temperature range, preferably in a less than 40° C. temperature range or even in a less than 30° C. temperature range, or even less than 20° C. temperature range or even in a less than 10° C. temperature range. Such transition typically happens when the material passes from the melt state to the solid state.

The elastic modulus G', is measured by the method ASTM D4440-95, using flat plates oscillating at 1 Hz.

The material preferably also has an elastic modulus G' at 20° C. of less than 100,000 Pa, preferably less than 50,000 Pa or even less than 20,00 Pa.

This can be determined by the method ASTM D4440-95, using flat plates oscillating at 1 Hz.

The material preferably also has a loss tangent tan $\delta$ (G''/G') at 20° C. of more than 0.5, or even more than 1.0, or preferably more than 1.5, which can be calculated from the numbers for G' G'', as obtainable by the method ASTM D4440-95, using flat plates oscillating at 1 Hz.

The material preferably also has a surface energy $\sigma$ at 20° C. of less than 35 mJ/m$^2$, preferably less than 25 mJ/m$^2$.

This can be measured by determining the contact angle of a liquid to a layer of the active material, in solid state. This can be measured according to the sessile drop method with typically a number of test liquids: the surface energy is then calculated from such contact angles with the Owens-Wendt-Rabel-Kaelbe method (combining data from a number of test liquids). For example, as liquids of different polarities, ethylene glycol, thiodiglycol, p-Cymol and diiodomethane are used.

The contact angle on a layer of active material for each liquid is calculated, using the method described herein, whereby the layer is fixed in a liquid temperature control chamber (TFC100) in the absence of air and thereto under dry nitrogen. Such an even layer of active material is obtained by prepared by applying a layer of the active material in molten state onto a glass slide, ensuring there are no air bubbles entrapped in the melt.

In a preferred embodiment of the invention, the sticky material comprises an adhesive, typically a hot melt adhesive, which is viscous at process temperature, but solid at room temperature (20° C.).

Preferably, the process is to apply adhesives to absorbent articles, and therefore, the adhesive is preferably an adhesive to adhere different layers of the absorbent article together or the adhesive is an adhesive, which is to adhere removably. For example the adhesive serves to adhere fasteners of an absorbent article together, whilst allowing subsequent opening of the fasteners, or the adhesive serves to adhere the absorbent article to the wearer's underwear. In the latter case, the adhesive can be applied in the process herein on the absorbent article, typically on the backsheet thereof, or on a protecting release paper, which is removed by the user prior to adhering the absorbent article on to the garment (the release paper transferring the adhesive onto the absorbent article when the are connected during manufacturing). Preferred absorbent articles and uses of the adhesive are described hereinafter in more detail.

Typically, certain hot melt adhesives capable of fulfilling the requirements herein can be used. Such preferred hot-melt adhesives typically comprise a thermo-plastic base material, in combination with a tackifying resin, and mineral oils or waxes or a mixture of various such materials are preferred. Typical hot melt adhesives have a minimum melting temperature of about 80° C., often even about 100° C.

Preferred adhesives herein, capable of fulfilling the requirements a) to e) above, are Hot melt LAX307NE available from Savare'; Hot melt LAX3013NE, available from Savare'; Lunatack BD160, available from Fuller; National 134593A, available from national Starch. In particular an adhesive having the properties as defined above under a) to e) similar to Lunatack BD160, or of course Lunatack BD160 itself, are preferred.

Preferred may be that the material comprises a pigment, and thus that the transfer process or printing process results in an article having a coloured material thereon. For example, the process may involve transferring a coloured pattern onto an absorbent article, by transferring a material comprising a coloured pigment; typically the material comprises from 0.1 to 10% of the pigment, more preferably from 0.3 to 5% by weight of the material. Preferred may be that the material is a combination of at least an adhesive as described above and a pigment.

Other active materials, which are usefully transferred on articles, such as absorbent articles, by using the process herein, include lotions, hydrophobing agents, antimicrobials, surfactants, dies, provided they have the above properties, including the property of stickiness.

Transfer Tool

The transfer tool as used herein is a tool, which receives the sticky material on its surface, typically from another source, and transfers this from its surface onto an article, series of articles or web of articles.

Thus, the transfer tool can be any tool, having a surface capable of receiving the material and capable of transferring the material. Preferred is that the transfer tool has an endless surface and thus, that the tool is in the form of a rotating belt or preferably a roll, such as a printing roll or gravure printing roll, having cavities on its surface. It should be understood that the roll does not have to be cylindrical, but preferably is cylindrical.

The use of a roll enables a continuous transfer of the material from the tool to the articles and thus a faster or more accurate continuous process.

Preferably, the tool has a surface, which comprises a coating of material providing the contact angle requirements as defined herein, e.g. that the contact angle of the material and the transfer tool surface is more than 60°, preferably more than 70°, or even more than 75°, or even more than 80°. This can be determined by use of the sessile-drop method, as follows:

A drop of the active material in liquid state (e.g. melted) is applied onto a sample of the surface with an electronically software-controlled syringe used to generate the drop. The surface-sample and the syringe are fixed in an electrically controlled temperature control chamber (TC 350 ex Dataphysics).

Then the sessile drop is exposed to diffused light from one side and observed from the other side by means of the CCD camera of a video-supported contact goniometer (OCA20 ex Dataphysics). The contact angle is measured according to the following steps:

By means of the CCD camera a digital image of the drop on the surface is recorded. The position of the base line and also that of the drop contour is determined by calculating the difference of the brightness of one image spot to the adjacent image spot (adjacent area). The drop contour and the base line then result from the position of the maximum differences between brightnesses, i.e. of the maximum contrast. Then, the drop contour line is matched to the measured drop outline with the Young-Laplace method. (In the Young-Laplace method, a curve is matched that exactly follows the drop outline. The drop shape is determined by the force equilibrium between surface tension and gravity. In the Young-Laplace method, the corresponding equation is solved numerically, with the solution being adapted to the previously determined drop outline by means of a parameter). Then, the contact angle is measured as the angle between the surface and the tangent to drop shape in the contact point with the surface.

This measurement can for example be done with a video supported contact goniometer OCA20 ex Dataphysics, which determines the (static) contact angle according to the sessile drop method.

Preferred coatings comprise a polyfluorinated polymer. Preferred coatings have properties similar to Teflon, available from DuPont or similar to NF(3), available from Nanosol GMbH. Preferred coatings comprise Teflon and/or NF(3).

When the tool comprises cavities on its surface, which serve to receive the sticky material, said coating may be present only on the surface between the cavities, but more preferred (and more advantageous) is that the coating is present in the surface of the cavities, or on the total surface of the tool.

In a preferred process herein the tool is a printing roll, which may have in a preferred embodiment a diameter of 50 mm to 3000 mm or even from 100 mm to 800 mm.

Preferred may be that the tool, or preferably printing roll comprises a temperature control and that the roll is preferably heated such that at least the temperature of the surface of the tool is similar to the temperature of the material applied to the tool, or more preferably, to a tool-surface temperature which is at least 5° C. or even at least 10° C. or even at least 20° C. higher than the temperature of the material when initially applied to the tool.

Preferred may be that the tool, or preferably printing roll, has cavities on its surface, which have a pitch (shortest distance from the center of one cavity to the center of the closest next cavity) of less than 10 mm, preferably from 0.1 or even from 0.4 or even from 0.7 to 5 mm, or even to 3 mm, or even to 2 mm, or even to 1 mm. Preferred may be that the width or diameter of the cavity is from 0.1 mm to 1.8 mm. Preferred may also be that the cavity has a depth from 10 to 500 microns.

Preferred shapes of the surrounding of the cavities are round, square or diamond shapes. The walls of the cavities can be straight, so that the bottom of the cavity has an angle with the walls, or the walls can be curved so that the cavities are in the shape of a round, square, diamond dome. Preferred patterns of the cavities are such that the material is transferred in a dot pattern, or in the form of for example product description, product name, trade name, directions for use etc.

In addition, the cavities may be continuous in one dimension: a multitude of curved or straight lines, with a pitch (shortest distance from the centerline of one cavity to the centerline of the closest next cavity) of less than 10 mm, preferably from 0.1 or even from 0.4 or even from 0.7 to 5 mm, or even to 3 mm, or even to 2 mm, or even to 1 mm. Preferred may be that the width of the cavity is from 0.1 mm to 1.8 mm. Preferred may also be that the cavity has a depth from 10 to 500 microns.

Transfer Process

The process of the invention involves the transfer from a surface of a transfer tool of a sticky material onto an article, series of articles, or web of articles (herein together referred to as article or articles, unless stated differently).

A preferred process herein is part of a process for providing a (disposable) absorbent article comprising a first component and a second component material which are joined to one another by the material, which is an adhesive, as described hereinafter. The components may be any of the materials typically utilized in the context of disposable absorbent articles. Another preferred process herein is part of a process to provide a (disposable) absorbent article comprising said material, which is an adhesive on the backsheet, to be removably connected to the wearer's underwear, or on fasteners, used to removably fasten the article.

The process is such that the contact angle of the material and the transfer tool surface is more than 60°, preferably more than 70°, or even more than 75°, or even more than 80°. This can be determined by use if the sessile-drop method, described above.

Preferably, the process is suitable to continuously transfer the material and therefore, the articles are preferably a continuous series of articles or a web of articles. Series of articles means herein that the articles are distinct, separate articles, whilst a web of articles means herein that the articles are connected, but are separated at a later stage into separate articles. Thus preferably, the material is applied continuously and with preferably a continuous speed, onto the surface of the transfer tool (preferably a roll) and then continuously and preferably with a continuous speed applied onto the articles.

The process, in particular when continuous, preferably has a speed of at least 20 m/min, more preferably at least 100 m/min, or even at least 150 m/min, i.e. a speed that is such that at least 20 m or at least 100 m or at least 150 m of articles with the material is produce per minute.

The process is preferably such that the material is applied in an high on-dot amount, preferably at least 10 g/m², preferably at least 20 g/m² or even at least 40 g/m². Thus if the material is applied in a pattern, with thus on purposely areas which are not covered, this on-dot amount per area is obtained by measuring the amount of material for a number of covered area only, excluding any uncovered areas, and calculating the average amount for this number of covered areas (and optionally transferred into g/m²). Thus for example if 50% of a surface is covered with dots of the material and 50% is not covered (the purposely applied pattern thus being these dots), then the average weight per area of the total surface, having dots and uncovered parts, is half the on-dot weight per area. If the material is applied as to cover the whole surface area of the articles, the average weight per area of the total surface equals the on-dot area.

The process temperature as used herein is the temperature of at least the surface of the transfer tool, or even the tool as a whole. The process temperature is such that the active material has the viscosity as defined herein. Thus for example, if the material is solid at room temperature, the temperature of the tool is such that the material melts and has a viscosity as defined herein.

Preferred process temperatures can for example be from 80° C. to 250° C., or more preferably from 110° C. to 175° C., preferably 130° C. to 170° C.

Preferably, the material is applied to the tool at a temperature $T_m$ which is less than, preferably at least 5° C., or even at least 10° C. less than, the temperature of the tool $T_t$; the temperature difference preferably being up to 100° C., or even 50° C. or even 30° C.

Preferably, the process involves application of the material onto the surface of the transfer tool with any suitable applicator, for example by use of a spraying system, slot coater, extruder, or optionally even by contacting the surface with a bath comprising the material. Preferred is however, that the material is applied onto the surface by use of an applicator which dispenses the material onto the surface, such as an extruder, typically positioned such that gravity aids the deposition of the-material, e.g. that the applicator is positioned substantially above the surface. Preferred may be hereby that the material is applied in the form of beads, preferably continuous beads. Preferred may be that the pitch of the beads is less than 20 mm, or even less than 15 mm or even less than 10 mm, preferably less than 5 mm, preferably more than 100 microns, or even more than 500 microns. Preferably, the process is continuous and the coater continuously applies such beads, which thus form endless beads on the surface. The coater applicator is preferably a unit having a multitude of applicators, preferably extruders, or the coater is a unit, which extrudes the active material through a die with a multitude of openings. The coater is typically positioned such that gravity aids the deposition of the material, e.g. that the applicator is positioned substantially above the surface of the roll. Preferred is that the coater applies more than 2 beads onto the surface, typically at least 4 or even at least 5 or even at least 8, or even at least 12. The exact amount depends in particular on the width of the surface and the viscosity of the active material during application, and the spreadability of the material, in particular by the coater blade.

The individual opening of the applicators of the coater can have any shape, but preferably the openings are round, square diamond-shape, rectangular, or triangular, most preferably round.

The coater is preferably heated by a heating element with a heat control, to ensure a constant temperature of the active material applied by the coater. Preferred may be that the active material is for example applied at a temperature of between 70° C. and 200° C., or even 80° C. to 190° C. or even to 170° C., or even 100° C. or even 110° C. to 160° C. The exact temperature typically depends on the temperature-dependent viscosity profile and/or elasticity profile of the active material applied in the process or with the equipment of the invention.

Preferred is that pressure is applied onto the coater, as in other common extrusion processes, such that the active material exits the coater aided by this pressure. Preferred may be for example that the coater has an unit containing active material to be applied, which is under a certain pressure and which forces the active material through the individual openings, e.g. through a die with openings, or a through individual applicator tubes. The pressure also aids to apply the required amount per surface area of the surface and the pressure may thus need to be adjusted if the speed of the surface changes.

The coater is preferably fixed in one position, to apply a constant, continuous amount of active material onto the first surface; alternatively, a coater with a reciprocal movement may be useful in certain process application, for example intermittently coating the supply of the active material in line with the cavities pattern on the surface.

Then, the transfer tool, as described herein above, with the material on its surface is contacted with the articles. This can be done by moving the articles towards the tool or vise versa or both.

Preferred is that the articles are supported on another (second) tool, preferably a roll which rotates such that the articles are rotated and contacted with the (rotating) transfer tool. This second tool has preferably a rotatable endless surface and it preferably rotates such that the articles are rotated and contacted with the transfer tool. Preferably, the second tool is a rotating belt or more preferably a roll, such as a cylindrical roll.

The second tool preferably has a surface with a shore hardness value of 25 to 90, preferably from 25 to 60, or even to 50. This is the shore A value as measured by the method ASTM D-2240, version 2000. Preferred may be that the second tool has a surface made of a resilient material, such as rubber.

Preferred is that the second tool is cooled, by a cooling element having a temperature control. Preferred is that the second tool is cooled such that at least its surface has a temperature which is at least 20° C. less than the (surface of) the transfer tool, or even at least 50° C. or even at least 80° C. less or even at least 100° C. less. Preferred is that the second tool's surface is even cooled to a temperature between 0° C. and 30° C. or even 0° C. to 15° C.

Because the process is such that sticky materials can be transferred with reduced stringing and with improved accuracy and efficiency, the process can be done vary fast. This has as advantage that even when the articles onto which the active material is applied have a melting point below the temperature of the material (or the transfer tool), the active materials can still be heated to such high temperatures, without causing the article to melt or deform. Thus, a preferred process herein is such that the process temperature, or the temperature of the active material is higher than the melting temperature of the articles. The temperature difference can for example be at least 10° C., or even at least 20° C. or even at least 30° C., and it can be as much as 80° C. or more typically up to 60 C or up to 45° C.

Preferred is that when the web of articles is stretchable, and the transfer tool has a process temperature as defined herein above, that the web of articles rotates around the second tool such that the exit angle of the web and the roll is between 30° and 70°, preferably between 32° and 45°.

The force applied by the second tool, and the articles thereon, onto the transfer tool is preferably at least 700 N/m, preferably at least 1500 N/m or even 2000 N/m or more. This force is the force applied per unit width of the article. This can be calculated by determining the pressure applied on the second surface, for example by measuring the pressure applied by an air piston, used to control the pressure and attached to the second surface, and calculating the force applied by the piston from this pressure and the surface area of the piston whereon this pressure is applied. The force per unit width is then calculated by dividing the force with this width of the article.

The second tool can have any dimension, typically dependent on the dimension of the transfer tool and the dimension of the articles supported and rotated by the second tool.

The second tool may be under vacuum, such that the vacuum or under pressure is applied through the second tool to the articles, which ensures the articles are more fixed on the second tool, during rotation and contacting of the first surface.

Preferred is that the process also uses a coater blade which spreads the active material onto the transfer tool and optionally pushes it into the cavities, when present. The coater blade preferably has a tangent angle with the surface of the tool of from 5° to 40°, or even from 15° to 30°. For transfer tools with a curved surface, such as rolls, this angle is thus the angle between the coating blade and the tangent line, which is the line grazing the surface in the point of contact with the coating blade and being perpendicular on the radius of the curved surface. If the surface is flat, the tangent equals the surface. If the first tool is moving (and the coating blade is typically not moving), this angle is the angle between the tangent and the coating blade on the side where the tool is moving from, e.g. the opposite side to the direction of motion.

The coater blade thereto typically has a constant pressure on the surface of the transfer tool. The coater blade preferably applies a constant pressure or force/length on the surface, preferably at least 600 N/m, preferably at least 700 N/m, or even 1000 N/m. Preferred may be that the coating blade is connected to a unit which can control this force/length, preferably connected with a pivot or spring.

The length of the blade can vary, but it is beneficial to keep the blade relatively short, preferably 1 to 20 cm, or even 5 to 15 cm, to ensure a more accurate constant force/length is applied on the first surface.

Preferred is that the material is applied above the roll, around the highest point of the roll. When the first surface is a roll, the blade is preferably positioned passed the lowest point of the roll, seen from the direction of rotation of the roll. Preferred positions are described herein after.

The articles, web of articles or series of articles obtainable by the process of the invention, have the active material applied in a homogeneous even layer, or in a pattern where the covered areas of the pattern (e.g. dots) have about the same amount of active material per surface area.

This can for example be reflected by the Coefficient of Variation (CoV) of the height of the applied active material and/or the CoV of the area of the applied active material. The CoV is defined as standard deviation divided by the average value, or the so-called reduced standard deviation, of the amount of active material of a certain area on which the active material is applied.

For example, when the article comprises a pattern of homogeneous dots, the homogeneous character is defined by the height-of-dot-CoV and area-of-dot-COV, for a certain area having a certain number of dots (thus, the CoV is being calculated for the dot area and the dot height measurements).

In the present invention the dot height CoV (%) for a surface area of the article having 30 dots is typically less than 6%, or even less than 5.5% or even less than 5%, or even less than 4.4%; the CoV (5) for the area per dot is typically less than 10% or even less than 8% or even less than 7% or even less than 6%.

The CoV has been determined from the area and the height of single dots, measured with Mikro CAD topographer from GFM. Area and height of single dots could be determined using standard equipment such as BioRad MRC 600 laser scanning confocal microscopy.

If the active material is applied evenly (and not in a pattern), the above CoV of height numbers apply for a surface area of 1 $cm^2$.

Absorbent Articles

The absorbent article of the present invention comprises the specific material as described above, preferably an adhesive as described above. Preferred may be that only a component of an absorbent article is used in the process herein, for example the backsheet of an absorbent article, or a release strip of an absorbent article, as described herein after in more detail.

The absorbent article is preferably a disposable absorbent article, or component thereof. The components of a absorbent article herein typically include one or more of: a wearer facing surface, typically provided by a liquid permeable substrate of fibrous or film like structure often called topsheet; a garment facing surface, preferably provided by a liquid impermeable substrate, referred to as a backsheet which is preferably also moisture vapor permeable and hence breathable and, an absorbent structure placed between the wearer facing surface and the garment facing surface, typically termed the absorbent core. The different features are herein also referred to as components.

The absorbent article can also comprise any of the components or features usual in the art, in particular side wrapping elements, side flap components, or wings as well as any sort of extensibility or elastication feature. In the production of absorbent articles several adhesive connections are typically formed, which can be applied with the process according to the present invention. For example, a typical sanitary napkin or panty liner comprises an adhesive area on the garment facing surface of the backsheet providing panty-fastening, the adhesive typically being covered by a release paper, wrapper or the like prior to use of the article and removed prior to use to attach it to the garment.

The absorbent article for absorbing liquid is described below by reference to a sanitary napkin or panty liner. However products such as adult or baby diapers, or incontinence products comprising adhesives can similarly benefit from the process of the present invention.

Each of said components of the absorbent article comprise at least one layer, which has a wearer facing surface and a garment facing surface. Typically, garment facing surfaces form a common interface with the wearer facing surface of an adjacent component or layer. The components or layers are joined together across this common interface. In this manner, the topsheet is joined to the absorbent core, and the core is joined to the backsheet. Furthermore, each of said topsheet, backsheet and core components may comprise more than one layer and these layers may also be similarly joined. In addition, the topsheet may be directly or indirectly joined to the backsheet at the periphery of the absorbent article and in the wings if present. Furthermore, particularly for sanitary napkin, panty liner and incontinence product applications, the garment facing surface of the backsheet provides the surface to which the absorbent article is joined to the garment of the user of the product to provide the panty fastening adhesive. Similarly if the product is a winged product, the wings are also provided with adhesive in order to secure the wings to the garment facing surface of the undergarment. These surfaces are typically provided with protective covers, which are removed prior to use.

Thus, the absorbent article of the invention is typically such that at least one of the wearer or garment facing surfaces of the topsheet, core or backsheet components comprises an active material as defined herein, preferably applied according to the process of the present invention. Preferably, this is an adhesive. Preferably, at least the garment-facing surface of the backsheet is applied with an adhesive area according to the present invention. More preferably at least the garment facing surface of the backsheet and at least one other surface are joined to another by application of the adhesive area of the present invention and most preferably all of the common interfaces of the components of the article are joined together by the application of adhesive in the manner of the present invention.

The absorbent articles of the invention will now be described with reference to the application of a panty-fastening adhesive to the garment-facing surface of the backsheet. However, as discussed herein above the invention is equally applicable for the adhesion of the common interface between any of the other surfaces of the components of the absorbent article. Typically, at least a portion of the garment-facing surface of the backsheet is coated with typically a pressure sensitive adhesive as described herein above, to form the panty fastening adhesive. Prior to use of the absorbent article the panty fastening adhesive is typically protected from contamination and from adhering to another surface where this is not desired, by a protective cover means such as a silicone coated release paper, a plastic film or any other easily removable cover. The protective cover means can be provided as a single piece or in a multitude of pieces e.g. to cover the individual adhesive areas. It also can perform other functions such as provide individualized packaging for the article or provide a disposal function. Any commercially available release paper or film may be used. Suitable examples include BL 30MG-A SILOX EI/O, BL 30 MG-A SILOX 4 P/O available from Akrosil Corporation, and M&W films available from Gronau in Germany, under the code X-5432.

If protective side flaps or wings are present then they may also be provided with optional fasteners thereon for additional security. The fasteners assist the protective side flaps to remain in position after they have been wrapped around the edges of the crotch surface of the undergarment by adhering to the garment-facing surface of the undergarment. Hence, the adhesive area applied in the wings is typically independent from the adhesive area applied as the so-called panty fastening adhesive on the backsheet. The fasteners of the side flaps may also be applied with adhesive areas according to the present invention and/or using the process of the invention, and are typically also covered with a protective cover means.

The topsheet is preferably compliant, soft feeling, and non-irritating to the wearer's skin. The topsheet also can have elastic characteristics allowing it to be stretched in one or two directions in portions of the topsheet or throughout its extension. Further, the topsheet is typically fluid pervious permitting fluids (e.g., menses and/or urine) to readily penetrate through its thickness. A suitable topsheet can be manufactured from a wide range of materials such as woven and non-woven materials; polymeric materials such as apertured formed thermoplastic films, apertured plastic films, and hydroformed thermoplastic films; and thermoplastic scrims. Suitable woven and nonwoven materials can be comprised of natural fibers (e.g., wood or cotton fibers), synthetic fibers (e.g., polymeric fibers such as polyester, polypropylene, or polyethylene fibers) or from a combination of natural and synthetic fibers or bi-/multi-component fibers. Preferred topsheets for use in the absorbent articles herein are selected from high loft nonwoven topsheets and apertured formed film topsheets. Apertured formed films are especially preferred for the topsheets because they are pervious to body exudates and yet non absorbent and have a reduced tendency to allow fluids to pass back through and rewet the wearer's skin. Thus, the surface of the formed film that is in contact with the body remains dry, thereby reducing body soiling and creating a more comfortable feel for the wearer. Suitable formed films are described in U.S. Pat. Nos. 3,929,135; U.S. Patent 4,324,246; U.S. Patent 4,342,314; U.S. Patent 4,463,045; and U.S. Patent 5,006,394. Particularly preferred micro apertured formed film topsheets are disclosed in U.S. Pat. Nos. 4,609,518 and U.S. Patent 4,629,643. A preferred topsheet for the present invention comprises the formed film described in one or more of the above patents and marketed on sanitary napkins by The Procter & Gamble Company of Cincinnati, Ohio as "DRI-WEAVE". The body surface of the formed film topsheet can be hydrophilic so as to help liquid to transfer though the topsheet faster than if the body surface was not hydrophilic. In a preferred embodiment, surfactant is incorporated into the polymeric materials of the formed film topsheet such as is described in PCT-publication WO 93/09741. This can be a, sticky material as defined herein and can thus also advantageously be applied by the process of the present invention.

Alternatively, the body surface of the topsheet can be made hydrophilic by treating it with a surfactant such as is described in U.S. Pat. No. 4,950,254. This can also be a sticky material as defined herein and can thus also advantageously be applied by the process of the present invention.

The absorbent article typically has an absorbent core, which may be selected from any of the absorbent cores or core system known in the art. As used herein the term absorbent core refers to any material or multiple material layers whose primary function is to absorb, store and distribute fluid. The absorbent core can include the following components: (a) an optional primary fluid distribution layer preferably together with a secondary optional fluid distribution layer; (b) a fluid storage layer; (c) an optional fibrous ("dusting") layer underlying the storage layer; and (d) other optional components.

These can for example be adhered together by the sticky adhesive defined herein, and this can be done using the process of the invention.

The fluid storage layer can comprise any usual absorbent material or combinations thereof. It preferably comprises absorbent gelling materials usually referred to as "hydrogel", "superabsorbent", hydrocolloid" materials in combination with suitable carriers. The absorbent gelling materials are capable of absorbing large quantities of aqueous body fluids, and are further capable of retaining such absorbed fluids under moderate pressures. The absorbent gelling materials can be dispersed homogeneously or non-homogeneously in a suitable carrier. The suitable carriers, provided they are absorbent as such, can also be used alone.

Suitable absorbent gelling materials for use herein will most often comprise a substantially water-insoluble, slightly cross-linked, partially neutralised, polymeric gelling material. This material forms a hydrogel upon contact with water. Such polymer materials can be prepared from polymerizable, unsaturated, acid-containing monomers that are well known in the art.

Suitable carriers include materials, which are conventionally utilized in absorbent structures such as natural, modified or synthetic fibers, particularly modified or non-modified cellulose fibers, in the form of fluff and/or tissues. Suitable carriers can be used together with the absorbent gelling material; however, they can also be used alone or in combinations. Most preferred are tissue or tissue laminates in the context of sanitary napkins and panty liners.

The absorbent structure may comprise a double layer tissue laminate formed by folding the tissue onto itself These layers can be joined to each other for example by adhesive, as defined herein, using the process of the invention, or by mechanical interlocking or by hydrogen bonds. Absorbent gelling material or other optional material can be comprised between the layers.

Modified cellulose fibers such as the stiffened cellulose fibers can also be used. Synthetic fibers can also be used and include those made of cellulose acetate, polyvinyl fluoride, polyvinylidene chloride, acrylics (such as Orlon), polyvinyl acetate, non-soluble polyvinyl alcohol, polyethylene, polypropylene, polyamides (such as nylon), polyesters, bicomponent fibers, tricomponent fibers, mixtures thereof and the like. Preferably, the fiber surfaces are hydrophilic or are treated to be hydrophilic. The storage layer can also include filler materials, such as Perlite, diatomaceous earth, Vermiculite, etc., to improve liquid retention.

The backsheet primarily prevents the absorbed matter and/or the matter contained in the absorbent structure from wetting articles that contact the absorbent product such as underpants, pants, pyjamas and undergarments. The backsheet is preferably impervious to liquids (e.g. menses and/or urine) and is preferably manufactured from a thin plastic film, although other flexible liquid impervious materials can also be used. As used herein, the term "flexible" refers to materials that are compliant and will readily conform to the general shape and contours of the human body. The backsheet also can have elastic characteristics allowing it to stretch in one or two directions. The backsheet typically extends across the whole of the absorbent structure and can extend into and form part of or all of the preferred side flaps, side wrapping elements or wings. The backsheet can comprise a woven or nonwoven material, polymeric films such as thermoplastic films of polyethylene or polypropylene, or composite materials such as a film-coated nonwoven material.

Preferably, the backsheet is a polyethylene film having a thickness of from about 0.012 mm (0.5 mil) to about 0.051 mm (2.0 mils). Exemplary polyethylene films are manufactured by Clopay Corporation of Cincinnati, Ohio, under the designation P18-0401 and by Ethyl Corporation, Visqueen Division, of Terre Haute, Ind., under the designation XP-39385. The backsheet is preferably embossed and/or matt finished to provide a more cloth like appearance.

Further, the backsheet is preferably such that it permits vapors to escape from the absorbent structure, i.e. be breathable, while still preventing extrudates from passing through the backsheet. Also breathable backsheets comprising several layers, e.g. film plus non-woven structures, can be used. Such backsheets thus comprise at least one gas permeable layer. Suitable gas permeable layers include 2 dimensional, planar micro and macro-porous films, macroscopically expanded films, formed apertured films and monolithic films. The apertures in said layer may be of any configuration, but are preferably spherical or oblong and may also be of varying dimensions. The apertures preferably are evenly distributed across the entire surface of the layer, however layers having only certain regions of the surface having apertures are also envisioned. Suitable materials are for example Gortex (TM) or Sympatex (FM) type materials well known in the art for their application in so-called breathable clothing. Other suitable materials include XMP-1001 of Minnesota Mining and Manufacturing Company, St. Paul, Minn., USA and Exxaire XBF-101W, supplied by the Exxon Chemical Company.

As used herein the term 2 dimensional planar layer refers to layers having a depth of less than 1 mm, preferably less than 0.5 mm, wherein the apertures have an average uniform diameter along their length and which do not protrude out of the plane of the layer. The apertured materials for use as a backsheet in the present invention may be produced using any of the methods known in the art such as described in EPO 293 482 and the references therein. In addition the dimensions of the apertures produced by this method may be increased by applying a force across the plane of the backsheet layer (i.e. stretching the layer). Suitable apertured formed films include films that have discrete apertures that extend beyond the horizontal plane of the garment facing surface of the layer towards the core thereby forming protuberances. The protuberances have an orifice located at its terminating end. Preferably said protuberances are of a funnel shape, similar to those described in U.S. Pat. No. 3,929,135.

Particularly preferred backsheets for the present invention comprise at least two layers comprising at least one layer selected from the above, such as microporous and apertured formed films and an additional layer which may also be selected from the above listed backsheets or may be a fibrous woven or nonwoven The most preferred breathable backsheet component comprises a microporous film and an apertured formed film or an apertured formed film and a hydrophobic woven or nonwoven material.

Preferred Process Steps of the Process of the Present Invention

In the following the process according to the present invention will be described with reference to the drawings. In FIG. 1 a schematic cross-sectional view of preferred printing equipment is shown.

The coater (100) has a multitude of applicator units in a row, of which only one is visible (110 in FIG. 1). The coater (100) applies via the applicator units (110) an active material, here an adhesive (220) on to the surface of a first roll (200), coated with a Teflon or NF(3) coating, so that a multitude of continuous beads of adhesive (220) are present on the surface of the first roll (200), including in the gravure cavities (210) of the surface of the first roll (200).

The direction of rotation of the first roll (200) is indicated and the positions of the coater (100), coater blade (300) and second roll (400) are indicated in degrees of the circle which the cross-section of the first roll (200).

The coater (100) is in FIG. 1 positioned at the top of the first roll (200) and thus at 0°. The coater (100) may be positioned at any position provided it is before the position of the second roll (400), in direction of rotation. Preferred may be that the coater (100) is positioned between 45° and 315°, preferably 10° and 350°, or thus at 0°.

The first roll (200) with the beads of adhesive (220) rotates towards the coater blade (300). The coater blade (300) is shown in more detail in FIG. 2.

Figure 2:
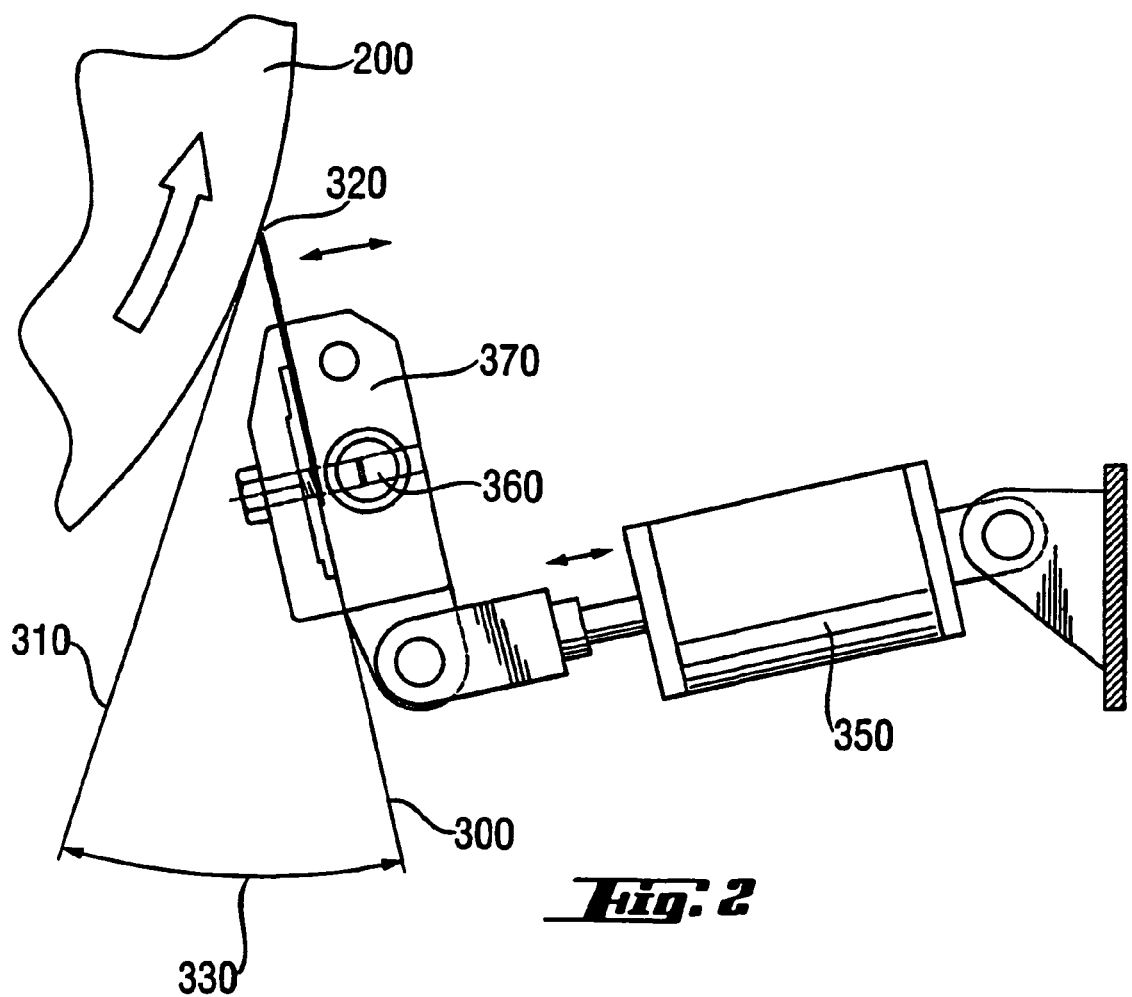
FIG. 2 shows an enlarged, detailed schematic cross section of the transfer tool-coater blade-arrangement as used herein.

The coater blade (300) contacts the first roll (200) such that the angle (330) of the coater blade top (320) and the tangent (310) of the first roll(200) in the contact point (320) is between 4 and 45, preferably between 15 and 30, as shown in FIG. 2. The pressure of the coating blade (300) onto the first roll (200) is kept constant, by use of an air piston (350) connected to a pivot (360) that connects to the blade (300) via a bracket (370). The coater blade (300) spreads out the beads of adhesive (220; not shown in FIG. 2 but see FIG. 1) and also pushes this into the gravure cavities (210; not shown in FIG. 2, but see FIG. 1).

Turning again to FIG. 1, the coater blade (300) is typically positioned passed the lowest point of the first roll (200), i.e. passed 180 of the circle of the first roll (200), in the direction of rotation. Preferred may be that the coater blade is positioned between 180° and 270°, or even 180° and 225°, or even between 190° and 210°.

The first roll (200) with the adhesive (220) now being spread out and pushed into the cavities (210) rotates further to then contact the second roll (400). The second roll (400) supports a web of articles (500), which rotates partially around the second roll (400). As can be seen in FIG. 1, the web of articles (500) travels from below the second roll (400) to rotate around the second roll (400) and exits above the second roll.

Figure 3:
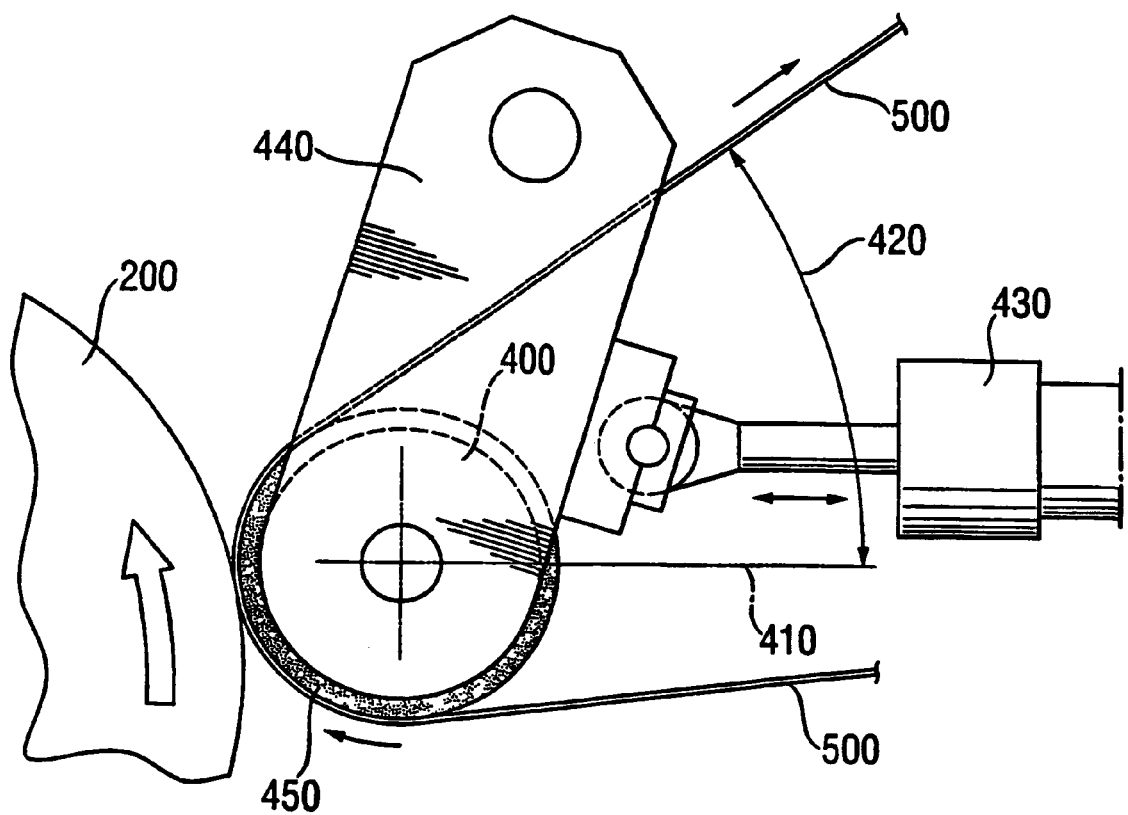
FIG. 3 shows an enlarged, detailed schematic cross-section of the transfer tool-second tool-arrangement as used herein.

The second roll (400) is shown in more detail in FIG. 3. There, it is shown how the web of articles (500) contacts the first roll (200), whereby the adhesive (220) is transferred onto the web of articles (500; not shown in FIG. 3; but see FIG. 1).

The positioning of the exit angle (420) of the web (500) is important. This exit angle (420) is the angle between the horizontal axis (410) through the center of the second roll (400) and the line of the web (500) upon exit, or if this line is not straight, the tangent to this line. The exit angle (420) is preferably as described above.

The pressure of the web of articles (500) and the second roll (400) is preferably kept constant by use of for example an air piston (430), connected to a bracket (440) which is connected to the second roll (400).

The second roll (400) preferably has specific shore hardness as defined herein above, and thereto it may have a coating (450) of a resilient material, such as rubber.

Turning back to FIG. 1, the second roll (400) may be positioned any where after the coater (100) in the direction of rotation, and when the coater blade (300) is present, after the coater blade (300). Typically, the second roll (400) is positioned between 225° and 0°, or even 225° and 315°, or even between 250° and 300°, or as shown in FIG. 1, around 270°.

After the adhesive (220) is transferred onto the web of articles (500) on the second roll (400), the first roll (200) rotates further to reach again the coater (100) position so that the process can start again. This is typically done in a continuous manner.

Preferred Process Steps of the Process of the Present Invention

In the following the process according to the present invention will be described with reference to the drawings. In FIG. 1 a schematic cross-sectional view of preferred printing equipment is shown.

The coater (100) has a multitude of applicator units in a row, of which only one is visible (110 in FIG. 1). The coater (100) applies via the applicator units (110) an active material, here an adhesive (220) on to the surface of a transfer tool (200), so that a multitude of continuous beads of adhesive (220) are present on the surface of the transfer tool (200), including in the gravure cavities (210) of the surface of the transfer tool (200).

The adhesive is for example Lunatack BD160. This transfer tool surface has a coating of NF(3) or Teflon (thus both the surface of the cavities and between the cavities).

The direction of rotation of the transfer tool (200) is indicated and the positions of the coater (100), coater blade (300) and second roll (400) are indicated in degrees of the circle which the cross-section of the transfer tool (200).

The coater (100) is in FIG. 1 positioned at the top of the transfer tool (200) and thus at 0°. The coater (100) may be positioned at any position provided it is before the position of the second roll (400), in direction of rotation. Preferred may be that the coater (100) is positioned between 45° and 315°, preferably 10° and 350°, or thus at 0°.

The transfer tool (200) with the beads of adhesive (220) rotates towards the coater blade (300). The coater blade (300) is shown in more detail in FIG. 2.

The coater blade (300) contacts the transfer tool (200) such that the angle (330) of the coater blade top (320) and the tangent (310) of the transfer tool (200) in the contact point (320) is between 4 and 45, preferably between 15 and 30, as shown in FIG. 2. The pressure of the coating blade (300) onto the transfer tool (200) is kept constant, by use of an air piston (350) connected to a pivot (360) that connects to the blade (300) via a bracket (370). The coater blade (300) spreads out the beads of adhesive (220; not shown in FIG. 2 but see FIG. 1) and also pushes this into the gravure cavities (210; not shown in FIG. 2, but see FIG. 1).

Turning again to FIG. 1, the coater blade (300) is typically positioned passed the lowest point of the first roll (200), i.e. passed 180 of the circle of the transfer tool (200), in the direction of rotation. Preferred may be that the coater blade is positioned between 180° and 270°, or even 180° and 225°, or even between 190° and 210°.

The transfer tool (200) with the adhesive (220) now being spread out and pushed into the cavities (210) rotates further to then contact the second roll (400). The second roll (400) supports a web of articles (500), which rotates partially around the second roll (400). As can be seen in FIG. 1, the web of articles (500) travels from below the second roll (400) to rotate around the second roll (400) and exits above the second roll.

The second roll (400) is shown in more detail in FIG. 3. There, it is shown how the web of articles (500) contacts the transfer tool (200), whereby the adhesive (220) is transferred onto the web of articles (500; not shown in FIG. 3; but see FIG. 1).

The positioning of the exit angle (420) of the web (500) is important. This exit angle (420) is the angle between the horizontal axis (410) through the center of the second roll (400) and the line of the web (500) upon exit, or if this line is not straight, the tangent to this line. The exit angle (420) is preferably as described above.

The pressure of the web of articles (500) and the second roll (400) is preferably kept constant by use of for example an air piston (430), connected to a bracket (440) which is connected to the second roll (400).

The second roll (400) preferably has specific shore hardness as defined herein above, and thereto it may have a coating (450) of a resilient material, such as rubber.

Turning back to FIG. 1, the second roll (400) may be positioned any where after the coater (100) in the direction of rotation, and when the coater blade (300) is present, after the coater blade (300). Typically, the second roll (400) is positioned between 225° and 0°, or even 225° and 315°, or even between 250° and 300°, or as shown in FIG. 1, around 270°.

After the adhesive (220) is transferred onto the web of articles (500) on the second roll (400), the transfer tool (200) rotates further to reach again the coater (100) position so that the process can start again. This is typically done in a continuous manner.

What is claimed is:

1. An absorbent article, comprising a sticky material which has a peel force of at least 0.1 N/cm at an average basis weight of 20 g/cm² and
    a viscosity η of less than 2500 mPa·s at a temperature of between 80 degrees C. to 250 degrees C.; and
    an elastic loss modulus G', which increases from 10 to 10,000 Pa in less than 60° C. temperature range as measured by the method ASTM D4440-95, using flat plates oscillating at 1 Hz, wherein the sticky material is disposed on a garment facing surface of the absorbent article.

2. The absorbent article of claim 1 wherein the sticky material has:
    an elastic modulus G' at 20° C. of less than 100,000 Pa,;
    a loss tangent tan δ (G"/G') at 20° C. of more than 0.5 as measured by the method ASTM D4440-95, using flat plates oscillating at 1 Hz; and
    a surface energy σ at 20° C. of less than 35 mJ/m².

3. An absorbent article comprising a sticky material which has a peel force of at least 0.1 N/cm at an average basis weight of 2 g/cm² and a surface energy σ at 20° C. of less than 25 mJ/m².

4. The absorbent article of claim 1 wherein the sticky material comprises an adhesive and a pigment.

5. The absorbent article of claim 3 wherein the sticky material comprises an adhesive and a pigment.

6. The absorbent article of claim 1, wherein the absorbent article further comprises a backsheet, and wherein the sticky material is disposed on the backsheet.

7. The absorbent article of claim 1, wherein the absorbent article further comprises a backsheet and a release strip attached to the backsheet, wherein the sticky material is disposed on the release strip.

* * * * *